United States Patent [19]

Lampert et al.

[11] Patent Number: 5,142,406
[45] Date of Patent: Aug. 25, 1992

[54] ELECTROCHROMIC OPTICAL SWITCHING DEVICE

[75] Inventors: Carl M. Lampert, El Sobrante; Steven J. Visco, Berkeley, both of Calif.

[73] Assignee: The Regents of the University of California, Oakland, Calif.

[21] Appl. No.: 606,063

[22] Filed: Oct. 30, 1990

[51] Int. Cl.⁵ .............................................. G02F 1/153
[52] U.S. Cl. ..................................... 359/269; 359/275
[58] Field of Search ................. 350/357; 359/269, 275

[56] References Cited

U.S. PATENT DOCUMENTS

| | | | |
|---|---|---|---|
| 4,781,443 | 11/1988 | Giles | 350/357 |
| 4,833,048 | 5/1989 | Dejonghe et al. | 429/104 |
| 4,917,974 | 4/1990 | Dejonghe et al. | 429/104 |
| 4,992,559 | 2/1991 | Kathirgamanathan et al. | 549/76 |

OTHER PUBLICATIONS

Lampert, Carl "Electrochromic Materials and Devices for Energy Efficient Windows" Solar Energy Materials (1984) 1-27.
"Chemical and Optical Studies of Electrochromic Hydrated Nickel Oxide Films and Devices" from Large Area Chromogenics: Materials and Devices for Transmittance Control, C. M. Lampert et al. Optical Engineering Press, Bellingham, Wa., 1989.

Primary Examiner—Andrew J. James
Assistant Examiner—Robert Limanek
Attorney, Agent, or Firm—Paul Martin; Kathleen Moss; Pepi Ross

[57] ABSTRACT

An electrochromic cell is disclosed which comprises an electrochromic layer, a polymerizable organo-sulfur layer which comprises the counter electrode of the structure, and an ionically conductive electronically insulating material which comprises the separator between the electrodes. In a preferred embodiment, both the separator and the organo-sulfur electrode (in both its charged and uncharged states) are transparent either to visible light or to the entire solar spectrum. An electrochromic device is disclosed which comprises such electrodes and separator encased in glass plates on the inner surface of each of which is formed a transparent electrically conductive film in respective electrical contact with the electrodes which facilitates formation of an external electrical connection or contact to the electrodes of the device to permit electrical connection of the device to an external potential source.

26 Claims, 1 Drawing Sheet

ELECTROCHROMIC OPTICAL SWITCHING DEVICE

The invention described herein arose in the course of, or under, Contract No. DE-AC03-76SF00098 between the United States Department of Energy and the University of California.

BACKGROUND OF THE INVENTION

1. Field of the Invention

This invention relates to an electrochromic optical switching device. More particularly, this invention relates to an optical switching device comprising an electrochromic electrode and a reversible polymerization counter electrode.

2. Description of the Related Art

Electrochromism comprises a reversible color change which occurs in certain materials by an applied electric field or current. Electrochromic films made from such materials may be typically used in structures such as eyeglasses, sunglasses, protective goggles, switchable mirrors and sun visors, automobile windows, architectural windows, aircraft windows, marine windows, spacecraft windows, calculators, computer display screens, large area information displays (such as in airports, railway stations, motorways, stock exchange boards), voltage indicators, computer memory elements, auto headlamp covers, and windows for watches. Such electrochromic films can also be used on opaque substrates including metallic or metal-like surfaces and in combination with solar cells.

Lampert in "Electrochromic Materials and Devices for Energy Efficient Windows", published in Solar Energy Materials 11 (1984), pp. 1-27, North-Holland, Amsterdam, surveys the use of a number of compounds which are capable of functioning as electrochromic materials and discusses their applicability in particular for use in the construction of optical shutters for windows.

In a chapter entitled "Chemical and Optical Studies of Electrochromic Hydrated Nickel Oxide Films and Devices", in "Large Area Chromogenics: Materials and Devices for Transmittance Control", authored by Lampert and Granqvist and published by Optical Engineering Press, Bellingham, WA, 1990, the use of hydrated nickel oxide in the construction of electrochromic devices is particularly discussed.

While the characteristics of such electrochromic devices are of interest in a number of applications, construction of such devices is somewhat complicated. The electrochromic material used in such a device forms one electrode of an electrochemical cell. In particular, where transparent electrochromic devices are being constructed, the counter electrode of the cell must, therefore, either be a colorless electrode or a matching electrochromic material, i.e., a second material which will also become transparent at the same charge/discharge level as the first electrode. Since one electrode functions as the cathode and the other as the anode, two different electrochromic materials must be utilized which will have such matching or complimentary characteristics, which is not an easy task.

The cost of the electrode materials utilized is also a factor which must be taken into account, as well as the electrochemical compatibility of the electrode materials to one another, and to other materials used in the cell such as electrolytes, separators, insulators, etc. The choice of electrode materials is further constricted by the need to choose electrode materials which will not form insoluble (nonreversible) compounds in the cell which would otherwise greatly shorten the life of the device, i.e., the number of charge/discharge cycles.

It would also be advantageous, from the standpoint of handling, as well as corrosion, to use solid materials in preference to liquid materials in the construction of an electrochromic device.

Recently, the use of polymerizable organo-sulfur compounds as electrode materials for rechargeable electrochemical cells has been discovered. Dejonghe et al. U.S. Pat. No. 4,833,048 describes and claims such a cell wherein polymerizable organo-sulfur material serves as the cathode of such a cell. The polymerizable organo-sulfur material described therein has a general formula, in its charged state, of $(R(S)_y)_n$ where $y = 1-6$, $n = 2-20$, and R is one or more of the same or different aliphatic or aromatic organic moieties having 1-20 carbon atoms. When the organo-sulfur electrode material is in its charged state, the sulfur atom (or atoms) of the basic $R-(S)_y-$ group (monomer) forms an -S-S- bond with a sulfur atom of another $R-(S)_y-$ group forming, in its L simplest (dimerized) form, R-S-S-R, i.e., the polymerized state of the organo-sulfur electrode material.

Cells respectively utilizing liquid and solid versions of such organo-sulfur electrodes are further described and claimed in U.S. Pat. No. 4,917,974 and U.S. Pat. application Ser. No. 07/421,091, filed Oct. 13, 1989.

SUMMARY OF THE INVENTION

It is, therefore, an object of this invention to provide an electrochromic device comprising an electrochromic material and a reversible organo-sulfur polymerization electrode.

It is another object of this invention to provide an electrochromic device comprising an electrochromic material as one electrode and a reversible organo-sulfur polymerization material as a counter electrode.

It is still another object of this invention to provide an electrochromic device comprising an electrochromic material as one electrode and a reversible organo-sulfur polymerization material as a counter electrode separated by an ionic conductor therebetween.

It is yet another object of this invention to provide an electrochromic device comprising an electrochromic material in a solid state as one electrode, a reversible organo-sulfur polymerization material in a solid state as a counter electrode, and a solid state ionic conductor separating the electrodes.

It is a further object of this invention to provide an electrochromic device comprising a transparent electrical conductor in electrical contact with an electrochromic material in a solid state as one electrode, a transparent electrical conductor in electrical contact with a reversible organo-sulfur polymerization material in a solid state as a counter electrode, and a solid state ionic conductor separating the electrodes.

These and other objects of the invention will be apparent from the following description and accompanying drawings.

DETAILED DESCRIPTION OF THE INVENTION

Figure 1:
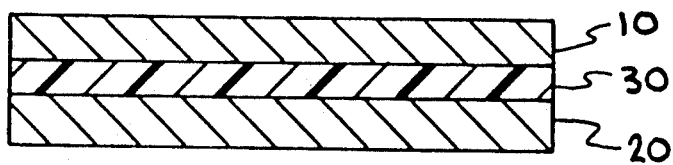
FIG. 1 is a vertical cross-sectional view of an electrochromic structure in its simplest form showing an electrochromic material as one electrode and a polymerizable organo-sulfur material as the counter electrode with an ionically conductive insulator separating the electrodes.

The electrochromic structure of the invention, as shown in its simplest form FIG. 1, comprises an electrochromic layer 10, which comprises one electrode of the structure, a polymerizable organo-sulfur layer 20, which comprises the counter electrode of the structure, and an ionically conductive insulating material 30, which comprises the separator between the electrodes. In a preferred embodiment, both the separator and the organo-sulfur electrode (in both its charged and uncharged states) are transparent either to visible light (narrow band) or to the entire solar spectrum (broad band).

By use of the term "transparent" herein is meant a material which will transmit at least about 70% of the electromagnetic radiation in the particular wavelength band, which may be either a broad band or a narrow band, or even a specific band or wavelength of light, e.g. red light or blue light.

By use of the term "semi-transparent" herein is meant a material which will transmit from about 20% to below about 70% of the electromagnetic radiation in the particular wavelength band, which, as stated above, may be either a broad band or a narrow band, or even a specific band or wavelength of light.

By use of the term "broad band", with respect to any of the materials used in forming the electrochromic device of the invention, including the electrochromic material, the polymerizable organo-sulfur material, the separator, or any other materials used in the device through which such radiation must pass for proper operation of the device, is meant the solar transmission band of from about 300 nm. to about 2500 nm. By "narrow band" is meant the normally visible light spectrum of from about 390 nm. to about 760 nm.

An electrochromic material may be broadly defined as a material in which a reversible color change occurs by application of an electric field or current. More particularly, an electrochromic material may be defined as a material having a charge capacity of about 10 to about 200 millicoulombs/cm.$^2$ wherein application of a potential of from about 1 to about 10 volts, typically from about 1.5 to about 2.5 volts, results in a transmission change ranging from a minimum change of about 20% up to a theoretical maximum of about 100% change in a particular electromagnetic radiation band. For example, a transmission change from a maximum of about 80% transmission down to a minimum of about 5% transmission (or vice versa) upon application of a potential of from about 1 to about 5 volts would represent a maximum of about 75% change in transmission.

Materials which may comprise electrochromic layer 10 include transition metal oxides and metal hydroxides, such as tungsten oxide ($WO_3$), molybdenum oxide ($MoO_3$), niobium oxide ($Nb_2O_5$, $Nb_2O_3$), vanadium oxide ($V_2O_5$), titanium oxide ($TiO_2$ or $Ti_2O_5$), copper oxide ($Cu_2O$ or uncolored CuO), bismuth oxide ($Bi_2O_3$), lead oxide (PbO or $PbO_2$), chromium oxide ($Cr_2O_3$), rhodium oxide (RhO, Rh(OH)$_x$, $Rh_2O_3$, or RhO)$_2$, cobalt oxide (CoO), manganese oxide (MnO or Mn(OH)$_2$), ruthenium hydroxide (Ru(OH)$_x$), nickel oxide (NiO or Ni(OH)$_2$), osmium hydroxide (Os(OH)$_x$), or iridium oxide (IrO, $IrO_2$, or Ir(OH)$_3$).

Electrochromic layer 10 may also comprise mixtures of any of the above, especially, tungsten oxide-vanadium oxide, tungsten oxide-titanium oxide, molybdenum oxide-vanadium oxide, molybdenum oxide-tungsten oxide, nickel oxide-manganese oxide, nickel oxide-cobalt oxide, iridium oxide-tin oxide ($SnO_2$), and iridium oxide-indium oxide ($In_2O_3$).

Other compounds which may be used as electrochromic material 10 include heteropolyacids such as phospho-tungstic acid ($H_3PO_4(WO_3)_{12}nH_2O$); redox compounds, such as ferric ferrocyanide ($Fe_4[Fe(CN)_6]_3$) or lithium ferric ferrocyanide ($Li_xFe_{4-x}[Fe(CN)_6]_3$); and metal oxide cermets, such as gold tungstate (Au-$WO_3$) and platinum tungstate (Pt-$WO_3$).

Electrochromic layer 10 may also comprise organic electrochromic materials, such as viologens (halides of quaternary bases derived from 4,4'dipyridinium (($C_5H_4N)_2$), e.g., diheptylviolgen-dibromide (($C_7H_{15})_2(NC_5H_4)_2Br_2$), (bis-4 (-ethylpyridine-4'-y)pyridium)-perchlorate, benzyl viologen, and polyviologen dibromide mixtures such as 1,1'-dibenzyl-4,4'-bipyridinium difluorborate and 5,10-dihydro-5,10-dimethylphenazine; methylviologen compounds; pyridine ($C_5H_5N$); ortho-tolidine ($C_{14}H_{18}N$), 4,4'-diamino-3,3'-dimethylbiphenyl; anthraquinones, such as 2-tertiary butylanthraquinone ($C_{14}H_7O_2C(CH_3)_3$); phenothiazines, such as methylene blue ($C_{16}H_{18}ClN_3S$); tetra thiafulvalene ($C_6H_4S_4$); polymers such as pyrazoline ($C_3H_6N_2$); polythiophene (($C_4H_4S)_x$); polyaniline (($C_6H_5NH_2)_x$); polytriphenylamine ($[(C_6H_5)_3N]_x$); phthalocyanine lanthanides, such as lutetium diphthalocyanine (($C_{32}H_{16}N_8)_2Lu$); tris(5,5'-dicarbo(3-acrylatoprop-1-oxy)2,2'bipyridine)ruthenium(II).

The thickness of the electrochromic material, which may be either in a solid or liquid state, should be sufficient, as a minimum, to provide a continuous film, i.e., usually at least about 100 Angstroms ($10^{-8}$ meters). This, in turn, may be at least partially controlled by the method used in forming the electrode, as will be discussed below. The thickness of the electrochromic electrode will be further governed by the desired degree of light transmission as well as the desired amount of change in light transmission as the electrochromic material passes from either a charged state to a discharged state or vice versa. Usually a maximum thickness of about 1 micron ($10^{-6}$ meters) for solid state materials or 1000 microns ($10^{-3}$ meters) should not be exceeded, since excessively thick layers of electrochromic materials may become ineffective or slow down the overall response time of the device because of the longer ionic paths.

The electrochromic electrode may be formed by any one of a number of different and well known methods such as, for example: by sputtering or reactive sputtering of electrochromic material onto a substrate; by chemical deposition from a solution; by evaporation; by spinning; by spraying; by chemical vapor deposition (CVD), including plasma-enhanced CVD; by vacuum evaporation, including electron beam evaporation, or using a reactive gas such as $O_2$; or by use of a solgel method. The electrochromic electrode may be may solely of electrochromic material, i.e. in pure form, or such electrochromic material may be used with a transparent carrier, such as polyethylene oxide.

Polymerizable organo-sulfur layer 20 comprises an organo-sulfur compound having the general formula, in its charged state, of $(R(S)_y)_n$ wherein $y = 1$ to 6, preferably 2 to 3; $n = 2$ to about 1,000,000, preferably over 4, and typically from about 5 to about 1,000,000; and R is one or more of the same or different aliphatic or aromatic organic moieties having 1 to 20 carbon atoms, which may include one or more oxygen, sulfur, or nitrogen atoms when R comprises one or more aromatic rings, or one or more oxygen, sulfur, nitrogen, or fluorine atoms associated with the chain when R comprises an aliphatic chain, wherein the aliphatic group may be linear or branched, saturated or unsaturated, and wherein either the aliphatic chain or the aromatic ring may have substituted groups thereon.

In special instances the organo-sulfur electrode, in its charged, i.e., polymerized state may have the formula $-(SRS)_x-(SR'S)_y-$, wherein both the R and R' may comprise the same or different organic moiety as described above, and the sum of x plus y is from 4 to 1,000,000. Such organo-sulfur compounds and others which are useful in the practice of the invention are further described in the aforesaid Dejonghe et al. U.S. Pat. Nos. 4,833,048 and 4,917,974 and Visco et al. Ser. No. 07/421,091, cross-reference to each of which is hereby made.

As described in the above identified patents and patent application, the organo-sulfur material has, in its simplest uncharged and monomeric form, the basic or backbone formula R—S—, i.e. R-$(S)_y$— where $y = 1$. In its charged (polymerized) state, the sulfur atom (or atoms) forms a —S—S-bond with a sulfur atom of another R—S—group forming the dimer R—S—S—R. Upon discharge, the —S—S—bond is broken and each R—S—group forms a salt with a metal ion or proton such as, for example, sodium or lithium, that is, R—S—Na or R—S—Li.

It will, of course, be understood, that the above description showing formation of a dimer as illustrating the polymerized form, is principally for illustrative purposes. Usually y is more than 1, preferably 2-3. A monomer with only a single sulfur atom, e.g., R—S—, would only be capable of forming a dimer with a similar molecule, and such monomers would, in effect, act as chain stoppers which would prevent further polymerization of other polymerized molecules, i.e., generally inhibit polymerization, and are, therefore, not preferred in actual practice. Thus, the unpolymerized monomer usually will have at least two sulfur atoms, e.g., —S—R—S—, which will preferably polymerize with other monomers having at least two sulfur atoms to form polymer chains having, for example when each molecule has two sulfur atoms, chains of —(-S—R—S—S—R—S)$_x$— and, upon discharge, the salt could have the formula, for example, Na—S—R—S—Na.

The organo-sulfur compound may be used either as a liquid or a solid, but preferably is used in a solid state. The organo-sulfur compound is transparent to electromagnetic radiation of at least a narrow visible band, and preferably is transparent to a broad band of light.

The organo-sulfur material may be formed into an electrode consisting solely of such organo-sulfur material or it may be mixed in a transparent and ionically conductive matrix such as polyethylene oxide or any other suitable transparent material as will be discussed below with respect to the ionic conductor or separator which separates the electrochromic material from the organo-sulfur material.

When the organo-sulfur material is used in a matrix, the minimum concentration of organo-sulfur material in the electrode is governed by the amount of charge needed to cause the electrochromic material to function (since the same amount of charge must flow into or out of the organo-sulfur electrode as is flowing into or out of the electrochromic electrode during the operation of the device). This minimum amount of organo-sulfur material (i.e., minimum amount of charge capacity) may be calculated based upon the amount of electrochromic material used in the device or determined empirically based on observation of the change in light transmission of the electrochromic material.

It should be noted, however, that the use of an amount of organo-sulfur electrode material in excess of this minimum amount is not considered to be harmful, although it may be economically wasteful.

The minimum thickness of the organo-sulfur electrode material must be sufficient to permit formation of a continuous film, usually at least about 100 Angstroms. The maximum thickness of the organo-sulfur electrode is not critical and will usually be governed by the attenuation in transparency or transmission which could occur if the electrode was formed of excessive thickness. Usually, a maximum thickness of about 0.1 millimeters ($10^{-4}$ meters) should not be exceeded to avoid degrading the performance of the device.

While the organo-sulfur electrode, in the preferred embodiment, is described as a transparent electrode, it should be noted that for certain application, e.g., displays, the organo-sulfur electrode need not be transparent, and such use of a non-transparent organo-sulfur electrode should be deemed to be within the scope of the invention.

Ionic conductor or separator 30, sometimes also referred to as an insulator, may comprise any insulator material capable of permitting ionic transport between the electrodes without permitting electron flow between the electrodes which would short out the device. That is, the separator is an electronically insulative material which is capable of ionic transport therethrough. Preferably, the separator will comprise a solid material. When constructing a transparent device, the separator material, in addition must be transparent, i.e., possess the same degree of transmission as the organo-sulfur electrode and the electrochromic electrode (when it is in a transparent mode or state).

Examples of transparent separator materials which may be used in the practice of the invention include polyethylene oxide (PEO), oxymethylene-linked polyethylene oxide, polypropylene oxide (PPO), polyvinyl alcohol, polyethylene glycol, polypropylene glycol, poly[bis((methoxyethoxy)ethoxy) phosphozene (MEEP); and inorganic separator materials such as tantalum oxide ($Ta_2O_5$), cesium oxide ($Cs_2O$), aluminum oxide ($Al_2O_3$), magnesium fluoride ($MgF_2$), or a silicon oxide (SiO or $SiO_2$). Of the above materials, polyethylene oxide is a particularly preferred compound because although it is a solid (no vapor pressure), it has a sticky or gooey characteristic which results in good adherence and contact with the electrochromic and organo-sulfur electrodes. When the separator does not have to be transparent, other non-transparent materials, such as, for example, powdered carbon, can be added to the above listed separator materials or non-transparent separator materials may be substituted instead.

Dispersed through the separator is the electrolyte which may be in salt, acidic, or base form. The cation of the salt may comprise an alkali metal such as lithium, sodium, potassium, rubidium, and cesium, while the anion may comprise any element or compound such as triflate ($CF_3SO_3$), borate ($B_4O_7^2$), carbonate ($CO_3^2$), silanate (RSiO), silicate ($SiO_{2.5-1}^2$), phosphate ($HPO_4^2$), ohlorate ($ClO_4$), chlorine (Cl), or hydroxide (OH), which will not interfere with operation of the device. It should be noted that, in some instances, oxides may also be used as the anion if they are sufficiently soluble, and such oxide usage is intended to be included in the use of the terms "anion" and "salt".

Thus, the electrolyte will include at least one Group IA element selected from the class consisting of hydrogen, lithium, sodium, potassium, rubidium, and cesium. When the electrolyte is in acid or base form, it may comprise, for example, $H_3PO_4$, $(C_2H)_4NOH$, $HN(CF_3SO_2)_2$. The amount of electrolyte in the separator may range from about 6 to about 20 units of monomer (PEO) per molecule of electrolyte.

The separator may be formed, for example, when using polyethylene oxide (PEO), by mixing about 3 parts by weight of PEO powder with about 97 parts by weight of a solvent such as acetonitrile and then adding sufficient electrolyte to provide the aforementioned ratio of electrolyte molecules to units of separator monomer.

The thickness of the separator, i.e., the distance between the electrochromic electrode and the organo-sulfur electrode may range from about 0.01 millimeters ($10^{-8}$ meters) to about 0.1 millimeters ($10^{-7}$ meters).

Figure 2:
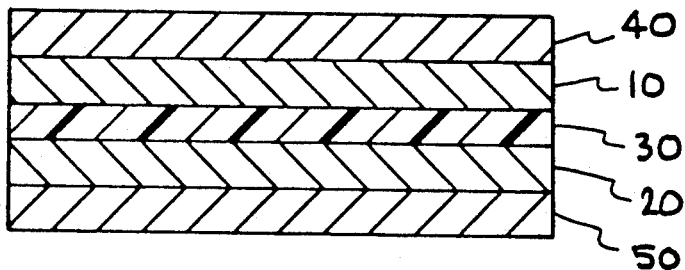
FIG. 2 is a vertical cross-sectional view of the structure of FIG. 1 showing an additional transparent conductor layer formed in electrical contact with the electrochromic electrode and a second transparent conductor layer formed in electrical contact with the polymerizable organo-sulfur counter electrode.

Turning now to FIG. 2, a more complete embodiment or version of the electrochromic structure or cell of the invention is illustrated in which transparent conductor layers 40 and 50 are respectively formed on the surfaces of electrochromic electrode 10 and organo-sulfur electrode 20 facing away from one another, i.e., the respective surfaces of electrodes 10 and 20 not in contact with ionic conductor or separator 30. The use of such transparent conductor layers facilitates providing a good electrical connection to the respective electrodes.

Transparent conductor layers 40 and 50 may comprise from about 0.01 to about 0.5 microns ($10^{-8}$ to $5 \times 10^{-7}$ meters) of the same or different conductive material such as tin oxide ($SnO_2$) doped with antimony or fluorine ($SnO_2$:F,Sb), indium oxide ($In_2O_3$), indium oxide and tin ($In_2O_3$:Sn) (5—15% Sn), zinc oxide (ZnO), zinc oxide and indium (ZnO:In), zinc oxide and aluminum (ZnO:Al), cadmium stannate ($Cd_2SnO_4$), cadmium stannite ($CdSnO_3$), cadmium oxide (CdO), copper sulfide ($Cu_2S$), titanium nitride (TiN), or titanium oxynitride ($TiO_xN_{1-x}$) to provide electrical contact to the electrochromic electrode and the organo-sulfur electrode, providing a sheet resistance typically of about 10 to about 15 ohms/square.

Metals such as copper, silver, gold, aluminum, nickel, stainless steel, chromium, titanium, rhodium, and brass may also be used as transparent conductive layers 40 and 50 in thicknesses ranging from about 30 to about 1000 Angstroms (about $3 \times 10^{-9}$ to about $10^{-7}$ meters).

As is well known to those skilled in the art, such a transparent conductor layer can be produced by any one of several techniques such, for example, as by vacuum deposition, sputtering, evaporation, solution dipping, chemical vapor deposition, and spraying.

Figure 3:
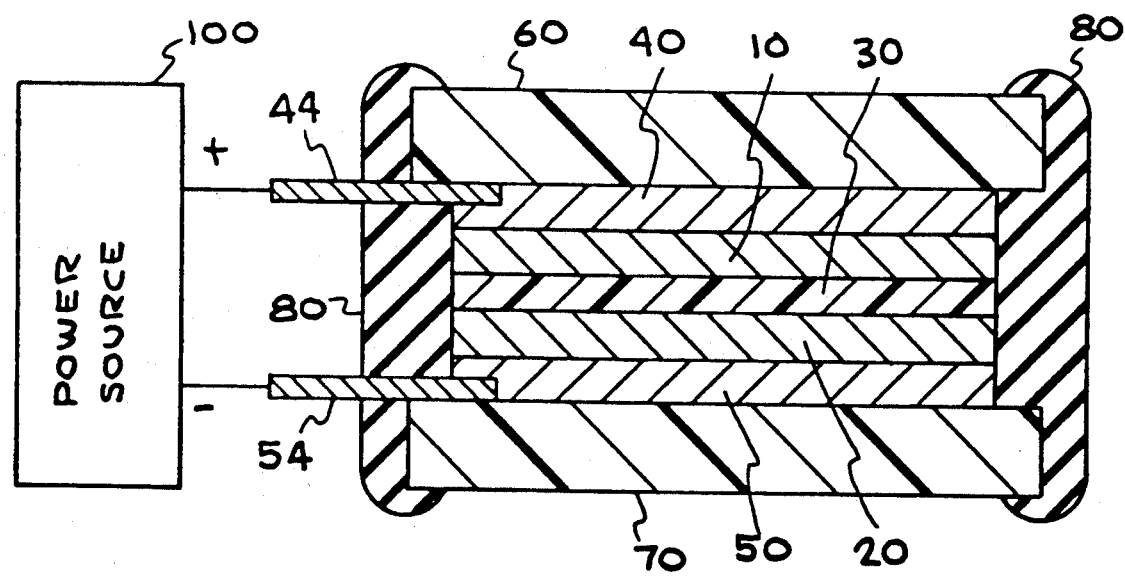
FIG. 3 is a vertical cross-sectional view of a device comprising the structure of FIG. 2 formed between transparent glass or plastic substrates.

In FIG. 3, the construction of an electrochromic device is illustrated, utilizing the structure or cell shown in FIG. 2. A glass or plastic substrate 60 is coated with a layer of transparent electrically conductive material to form transparent electrical conductor 40 thereon. An electrically conductive connector 44 is then attached to conductor 40 to provide an external connection to the device from potential source 100. A layer of electrochromic material is then applied over transparent conductor 40 to form electrochromic electrode 10 thereon. Similarly, a second glass or plastic substrate 70 is coated with the same or different transparent electrically conductive material to form transparent conductor 50 and a second electrically conductive connector 54 is then attached to conductor 50 to provide external electrical connection to the other terminal of potential source 100. A layer of organo-sulfur material is then formed over conductor 50 to form organo-sulfur electrode 20.

The ionically conductive separator material may then be applied to the exposed surface of either electrode 10 or electrode 20, or to both surfaces, to form separator layer 30. The two portions of the structure may then be placed together to form the device shown in FIG. 3.

It should be noted, in this regard, that the various layers need not be formed in the manner just described. For example, after forming transparent conductor 40 on glass or plastic substrate 60, and forming electrochromic electrode 10 over conductor 40, the separator layer 30 could be formed on electrode 10, the organo-sulfur electrode formed as a layer over separator 30, and the second transparent conductor 50 formed as a layer over electrode 20, followed by application of the second glass or plastic substrate 70 over conductor 50 to complete formation of the composite structure of the device.

The edges of the layers, and interfaces between layers, of the composite structure of the device may then be sealed by a sealing material 80 which could comprise any insulating material which is sufficiently non-porous to prevent entrance of foreign materials, including moisture, to such interfaces between the various layers of the composite structure. For example, an epoxy, a silicone, or a butyl rubber sealant compound, or a combination of same could be utilized for this purpose. In addition, if desired, a rigid frame such as a wood or metal frame could be fitted around the edges of the device to impart more mechanical strength to the device. If a metal frame is used, care will need to be exercised to prevent any electrical shorting of the layers. In such instances, the insulating sealant material 80 will provide sufficient electrical isolation and insulation of such a metal frame from the active layers of the device.

It should be noted, in this regard, that the preferable use of solid state materials in all of the layers make sealing the edges of the interfaces between the layers not mandatory from the standpoint of sealing in the materials used in construction of the device. Rather, the sealing is used to exclude foreign materials from penetrating into the structure which could interfere with the performance, or at least shorten the life of the device.

In operation, electrical contact 44 will be connected to either the negative or positive terminal of potential source 100 (depending upon the type of electrochromic material used in forming electrode 10) and electrical contact 54 will be attached to the other terminal of potential source 100 to change the transmission characteristics of the electrochromic material forming electrode 10. For example, when the electrochromic material in electrode 10 is $WO_3$, connecting contact 44 to the negative terminal of potential source 100, and contact 54 to the positive terminal of potential source 100 will cause the electrochromic material in electrode 10 to darken, i.e., lower the transmission of light through electrode 10.

It should be noted, in this regard, that electrode 20, i.e., the organo-sulfur material, remains transparent to light, regardless of whether electrode 20 is connected, via contact 54, to either the positive or negative terminal of potential source 100. This comprises one of the many advantages of the structure of the invention since, unlike many prior art devices, there is no need to try to match the transmission change characteristics of two different materials used in two electrodes so that a negative potential applied to one electrode (comprising one type of electrochromic material) would have the same effect on light transmission as a positive potential applied to the other electrode (constructed of a second type of electrochromic material).

While glass or plastic substrates 60 and 70 will normally comprise transparent materials, with plastic preferred if flexibility is desired, such substrates need not both be transparent if the type of device being constructed is one wherein transparency through the entire device is not needed or desired, i.e., a display device. In fact, for such a device, other substrate materials, e.g., metal substrates may be utilized if desired.

It should be further noted that while each of the above layers or components of the electrochromic cell have been described as discrete or separate components or layers, single layers may be formed which are capable of more than one function, and the use of such should be deemed to be within the scope of the invention. For example, either the electrochromic electrode or the organo-sulfur electrode could be constructed jointly with the transparent conductor material. Similarly, either the electrochromic electrode or the organosulfur electrode could be constructed jointly with the ionic separator layer. It may also be possible to construct the device of the invention with a second electrochromic material incorporated into the organo-sulfur electrode, for example, to achieve special effects.

The following examples will serve to further illustrate the invention.

EXAMPLE I

Onto a glass plate coated with a 4000 Angstrom thick transparent layer of tin oxide ($SnO_2$), was applied a 0.6 micron ($6 \times 10^{-7}$ meter) layer of tungstate ($WO_3$) electrochromic material over the tin oxide surface by electrochemical deposition from a tungsten peroxide solution comprising 1 gram of tungsten metal and 10 ml of $H_2O_2$.

After the electrochromic layer dried, a 0.01 mm.($10^{-5}$ meter) layer of polyethylene oxide (PEO) separator was applied by mixing 3 grams of PEO with 1.3 grams of lithium triflate ($LiCFSO_3$) and dissolving the mixture in 165 ml. of acetonitrile. A 0.01 mm. thick transparent organo-sulfur electrode was then formed by mixing together 1.6 grams of PEO, 0.5 grams of lithium triflate, and 1 gram of 2,5-dimercapto-1,3,4-thiadiazole, and dissolving the mixture in 40 ml. of acetonitrile solvent. The mixture was then applied over the separator layer and allowed to dry.

A second tin oxide-coated glass plate, such as previously described, was then placed over the organo-sulfur electrode.

The tin oxide layer abutting the electrochromic electrode was then connected to the negative terminal of a variable DC potential source and the tin oxide layer next to the organo-sulfur electrode was connected to the positive terminal of the DC power source. The voltage was gradually raised until it reached a potential difference between the electrodes of about 2.1 volts, at which a color change from transparent to deep blue was visually observed.

Similar results were obtained by forming a tungsten oxide film ($WO_3$) over the conductive layer by reactive sputtering, and by electrochemically depositing molybdenum oxidetungsten oxide ($MoO_3:WO_3$): films.

EXAMPLE II

A second device was constructed similarly to the device of Example I except that a hydrated nickel oxide was substituted for tungsten oxide as the electrochromic material. When a potential difference of 2.2 volts was applied between the electrochromic electrode (connected to the positive terminal) and the organo-sulfur electrode (connected to the negative terminal), the color of the electrochromic layer changed from transparent to brown.

EXAMPLE III

Another electrochromic device was constructed similar to that of Example II except that 0.9 grams of lithium hydrogen phosphate was also added to the PEO of the separator layer. The transparent electrochromic layer changed to a brown color when the electrochromic electrode was attached to the positive terminal of a power source and a potential of +2 volts was applied between the electrochromic electrode and the organo-sulfur electrode.

Thus, the invention provides an improved electrochromic structure wherein the use of a transparent organosulfur counter electrode with the electrochromic electrode permits construction of an inexpensive device using materials which may be in the solid state, are more chemically compatible with one another, which can be used with hydrogen, lithium, sodium and other ionic transport elements, and wherein the use of such a transparent organic counter electrode (in both the charged and uncharged states) makes matching of the characteristics of both cathode and anode electrochromic electrodes unnecessary, with the charge storage capacity of the organo-sulfur electrode adjustable to meet the requirements of the particular electrochromic electrode used, giving a designer maximum flexibility.

While specific and particular embodiments of the electrochromic/organo-sulfur cell of the invention have been illustrated and described modifications and changes of the apparatus, parameters, materials, etc. will become apparent to those skilled in the art, and it is intended to cover in the appended claims all such modifications and changes which come within the scope of the invention.

What is claimed is:

1. An electrochromic cell comprising:
   a) an electrochromic electrode;
   b) an organo-sulfur counter electrode comprising a compound having the general formula, in its charged state, of $(R(S)_y)_n$ wherein y is 1-6; n is 2 to 1,000,000; and R is one or more of the same or different aliphatic or aromatic organic moieties having 1 to 20 carbon atoms which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic chain may be linear, branched, saturated or unsaturated, and wherein either the aliphatic chain or the aromatic ring may have substituted groups thereon; and c) an electronically insulative separator material capable of ionic transport in contact with both of said electrodes.

2. The electrochromic cell of claim 1 wherein both said organo-sulfur electrode and said separator are transparent.

3. The electrochromic cell of claim 1 wherein at least one of said organo-sulfur electrode and said separator are semi-transparent.

4. The electrochromic cell of claim 1 which further includes an electrolyte containing a group IA element selected from the group consisting of hydrogen, lithium, sodium, potassium, rubidium, and cesium.

5. The electrochromic cell of claim 1 wherein said separator is selected from the group consisting of polyethylene oxide, oxymethylene-linked polyethylene oxide, polypropylene oxide, polyvinyl alcohol, polyethylene glycol, polypropylene glycol, poly[bis-((methoxyethoxy)ethoxy) phosphozene, tantalum oxide ($Ta_2O_5$), cesium oxide ($Cs_2O$), aluminum oxide ($Al_2O_3$), magnesium fluoride ($MgF_2$), and silicon oxide (SiO or $BiO_2$).

6. The electrochromic cell of claim 1 wherein said electrochromic electrode, said organo-sulfur electrode, and said separator all comprise materials in a solid state.

7. The electrochromic cell of claim 4 which further comprises a transparent electrical conductor in electrical contact with said electrochromic electrode and a second transparent electrical conductor in contact with said organo-sulfur electrode.

8. The electrochromic cell of claim 7 wherein said transparent electrical conductor is selected from the group consisting of tin oxide ($SnO_3$), tin oxide doped with antimony and fluorine ($SnO_2$:F,Sb), indium oxide ($In_2O_3$), indium oxide and tin ($In_2O_3$:Sn) (5-15% Sn), zinc oxide (ZnO), zinc oxide and indium (ZnO:In), zinc oxide and aluminum (ZnO:Al), cadmium stannate ($Cd_2SnO_4$), cadmium stannite ($CdSnO_3$), cadmium oxide (CdO), copper sulfide ($Cu_2S$), titanium nitride (TiN), titanium oxynitride ($TiO_xN_{1-x}$), copper, silver, gold, aluminum, nickel, stainless steel, chromium, titanium, rhodium, and brass.

9. The electrochromic cell of claim 7 wherein at least one of said transparent electrical conductors is in contact with a glass substrate.

10. The electrochromic cell of claim 7 wherein said transparent electrical conductors are in electrical communication with electrical contact members to permit charge and discharge of said electrodes by a potential source.

11. The electrochromic cell of claim 1 wherein said organo-sulfur electrode material is further characterized by a sulfur-sulfur bond, when in the charged state, which upon discharge of said organo-sulfur electrode, is broken to form an organo-sulfur metal salt with metal ions in said cell.

12. An electrochromic device comprising:
a) a first transparent electrically conductive film;

b) an electrochromic electrode capable of being in a transparent electrical charge state having a surface in electrical contact with said first transparent electrically conductive film;

c) a transparent organo-sulfur counter electrode comprising a compound having the general formula, in its charged state, of $(R(S)_y)_n$ wherein y is 2 to 3; n is 5 or more; and R is one or more of the same or different aliphatic or aromatic organic moieties having 1 to 20 carbon atoms which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic chain may be linear, branched, saturated or unsaturated, and wherein either the aliphatic chain or the aromatic ring may have substituted groups thereon, d) a second transparent electrically conductive film in contact with said organo-sulfur electrode;

e) an electronically insulative separator material capable of ionic transport containing an electrolyte containing a group IA element selected from the group consisting of hydrogen, lithium, sodium, and potassium, separating said electrochromic electrode from said organo-sulfur electrode; and f) a glass substrate in contact with one of said transparent electrically conductive films.

13. The electrochromic device of claim 12 including a second glass substrate in contact with the other of said transparent electrically conductive films.

14. The electrochromic device of claim 13 which further includes electrical contact members electrically connected, respectively, to said first and second transparent electrically conductive films.

15. The electrochromic device of claim 14 wherein said electrochromic electrode, said organo-sulfur electrode, and said separator all comprise materials in a solid state.

16. The electrochromic device of claim 15 which further includes sealing means which seal the end edges of said device.

17. The electrochromic device of claim 12 wherein said electrochromic electrode comprises a material capable of passing from a non-transparent state to a transparent or semitransparent state, depending upon the state of charge of said material, selected from the group consisting of transition metal oxides, heteropolyacids, metal-oxide cermets, mixed oxide composites, hydrous Group VIII metal oxides, organic electrochromic materials, and redox compounds.

18. The electrochromic device of claim 12 wherein said electrochromic electrode comprises a material capable of existing in a transparent or semitransparent state and a nontransparent state, depending upon the state of electrical charge of said material, selected from the group consisting of tungsten oxide ($WO_3$), molybdenum oxide ($MoO_3$), niobium oxide ($Nb_2O_5$), vanadium oxide ($V_2O_5$), titanium oxide ($TiO_2$ or $Ti_2O_5$), copper oxide ($Cu_2O$ or uncolored CuO), bismuth oxide ($Bi_2O_3$), lead oxide (PbO or $PbO_2$), chromium oxide ($Cr_2O_3$), rhodium oxide (RhO, $Rh(OH)_x$, $Rh_2O_3$, or RhO):, cobalt oxide (CoO), manganese oxide (MnO or $Mn(OH)_2$), ruthenium hydroxide ($Ru(OH)_x$), nickel oxide (NiO or $Ni(OH)_2$), osmium hydroxide ($Os(OH)_x$), iridium oxide (IrO, $IrO_2$, or $Ir(OH)_3$), tungsten oxide-vanadium oxide, tungsten oxide-titanium oxide, molybdenum oxide-vanadium oxide, molybdenum oxide-tungsten oxide, nickel oxide-manganese oxide, iridium oxide-tin oxide ($SnO_2$), iridium oxide-indium oxide ($In_2O_3$), phosphotungstic acid ($H_3PO_4(WO_3)_{12}nH_2O$), ferric ferrocyanide ($Fe_4[Fe(Cn)_6]_3$), lithium ferric ferrocyanide ($Li_{x-}Fe_{4-x}[Fe(Cn)_6]_3$), gold tungstate ($Au-WO_3$), platinum tungstate ($Pt-WO_3$), 4,4′dipyridinium (($C_5H_4N)_2$), diheptylviolgen-dibromide (($C_7H_{15})_2(NC_5H_4)_2Br_2$), (bis-4(-ethylpyridine-4′-y)pyridium)perchlorate, 1,1′-dibenzyl-4,4′-bipyridinium difluorborate, 5,10-dihydro-5,10-dimethylphenazine, methylviologen compounds, pyridine ($C_5H_5N$), 4,4′-diamino-3,3′-dimethylbiphenyl, orthotolidine ($C_{14}H_{18}N$):, anthraquinone, 2-tertiary butylanthraquinone ($C_{14}H_7O_2C(CH_3)_3$), phenothiazines, methylene blue ($C_{16}H_{18}ClN_3S$), tetra thiafulvalene ($C_6H_4S_4$), pyrazoline ($C_3H_6N_2$), polythiophene (($C_4H_4S)_x$), polyaniline (($C_6H_5NH_2)_x$), polytriphenylamine ($[(C_6H_5)N]_x$), lutetium diphthalocyanine (($C_{32}H_{16}N_8)_2Lu$), and tris(5,5′-dicarbo(3-acrylatoprop-1-oxy)-2,2′bipyridine) ruthenium(II).

19. The electrochromic device of claim 12 wherein said transparent electrically conductive films comprise tin oxide.

20. The electrochromic device of claim 12 wherein said separator material comprises polyethylene oxide.

21. An electrochromic device having one level of transparency when in one electrical charge state and a lower level of transparency when in another electrical charge state comprising:
a) a first transparent electrically conductive planar tin oxide film, including an electrical contact member;
b) a planar electrochromic solid state electrode capable of being in a transparent electrical charge state having a surface in electrical contact with said first transparent electrically conductive film and comprising one or more materials selected from the group consisting of transition metal oxides, heteropolyacids, metal-oxide cermets, mixed oxide composites hydrous Group VIII metal oxides, organic electrochromic materials, and redox compounds;
c) a transparent planar solid state organo-sulfur electrode having the formula, when in a charged state, of $(R(S)_y)_n$ wherein y is 2 to 3; n is 5 to about 1,000,000; and R is one or more of the same or different aliphatic or aromatic organic moieties having 1 to 20 carbon atoms which may include one or more oxygen, sulfur, or nitrogen heteroatoms when R comprises one or more aromatic rings, or one or more oxygen, sulfur, nitrogen, or fluorine atoms associated with the chain when R comprises an aliphatic chain, wherein the aliphatic chain may be linear, branched, saturated or unsaturated, and wherein either the aliphatic chain or the aromatic ring may have substituted groups thereon;
d) a second transparent electrically conductive tin oxide film in contact with said organo-sulfur electrode, including an electrical contact member;
e) an electronically insulative planar solid state separator comprising polyethylene oxide capable of ionic transport containing an electrolyte having one or more group IA elements selected from the group consisting of hydrogen, lithium, sodium, potassium, rubidium, and cesium separating said electrochromic electrode from said organo-sulfur electrode;
f) planar glass substrates in contact with said transparent electrically conductive films; and
g) sealing means to seal the end edges of said planar members of said electrochromic device.

22. The electrochromic cell of claim 1 wherein said organo-sulfur electrode comprising said compound having the general formula, in the charged state, of $(R(S)_y)_n$ has a value of y of from 3 to 4; and a value of n of over 4.

23. The electrochromic cell of claim 22 wherein said organo-sulfur electrode material is further characterized by a sulfur-sulfur bond, when in the charged state, which upon discharge of said organo-sulfur electrode, is broken to form an organo-sulfur metal salt with metal ions in said cell.

24. An electrochromic cell comprising:
a) an electrochromic electrode;
b) an organo-sulfur counter electrode comprising a organo-sulfur compound capable of polymerizing to form —S—S— bonds between sulfur-containing groups when in a charged state; and
c) an electronically insulative separator material capable of ionic transport in contact with both of said electrodes.

25. The electrochromic cell of claim 24 wherein said organo-sulfur counter electrode is semi-transparent, in both the charged and discharged states.

26. The electrochromic cell of claim 24 wherein said organo-sulfur counter electrode is transparent, in both the charged and discharged states, to electromagnetic radiation of at least a narrow band.

* * * * *